United States Patent [19]

Gaskill

[11] 4,037,183

[45] July 19, 1977

[54] REPLACEABLE SOLID STATE TRIP UNIT

[75] Inventor: George Gaskill, Hatboro, Pa.

[73] Assignee: I-T-E Imperial Corporation, Spring House, Pa.

[21] Appl. No.: 671,077

[22] Filed: Mar. 29, 1976

[51] Int. Cl.² ........................ H01H 73/00; H02H 3/08

[52] U.S. Cl. .......................................... 335/6; 335/18; 335/132; 335/172; 361/206; 361/115

[58] Field of Search ........................ 335/6, 18, 132, 38, 335/174, 172; 317/58, 33 SC, 36 TD

[56] References Cited

U.S. PATENT DOCUMENTS

| | | | |
|---|---|---|---|
| 3,723,818 | 3/1973 | Zocholl | 317/36 TD |
| 3,761,778 | 9/1973 | Willard | 317/58 |
| 3,783,423 | 1/1974 | Mater et al. | 335/174 |
| 3,826,951 | 7/1974 | Mater et al. | 335/172 |

*Primary Examiner*—Harold Broome

*Attorney, Agent, or Firm*—Ostrolenk, Faber, Gerb & Soffen

[57] ABSTRACT

A molded case multi-pole circuit breaker is provided with a removable and replaceable solid state trip unit constructed with all fault current detecting elements within a common housing. For each circuit breaker pole the trip unit includes an input and an output transformer feeding circuitry mounted on a board disposed within the common housing. The circuitry output is connected to operate a permanent magnet latch for release of a mechanical latch that normally holds the contact operating mechanism in a reset position.

10 Claims, 12 Drawing Figures

REPLACEABLE SOLID STATE TRIP UNIT

This invention relates to molded case multipole circuit breakers in general and more particularly relates to replacaeable solid state trip units for such circuit breakers.

Typically, multipole molded case circuit breakers are provided with thermal magnetic trip means that operate on the occurrence of predetermined fault current conditions in any of the poles to automatically open the contacts in all poles of the circuit breaker. In breakers of this type having relatively high continous current carrying capacity, sa in excess of 800 amps, the trip units of the individual poles are port of a removable and replaceable sub-assembly.

In order for a circuit breaker to provide maximum protection for a given load without tripping falsely, its tripping characteristics must be tailored to withstandability of the load against damage due to overheating and electromagnetic effects.

With prior art thermal magnetic trip units only a limited range of factory calibration and user adjustment are possible so that it is necessary for a supplier to carry many different trip units.

It has been known for some time that trip units utilizing solid state circuitry are more readily adjusted over a wider range of characteristics than are conventional magnetic trip units. In addition, solid state trip units achieve greater accuracy and repeatability, and with relatively simple adjustments obtain more complex time versus current characteristics. However, solid state trip units for circuit breakers of relatively high current ratings have been of excessive size. Further, factory installation was required, and the concept of interchangeable trip units did not appear to be achievable.

Accordingly, in accordance with the instant invention there is provided an interchangeable solid state trip unit having all of its current sensing circuit elements disposed within a common insulating housing. Among these circuit elements are an input and an output transformer for each pole of the breaker, with all of the output transformers feeding a solid state control circuit. Upon the occurrence of predetermined fault current conditions, the latter generates an output signal that releases a permanent magnet latch which in turn unlatches the mechanical latching system that normally maintains the circuit breaker contact operating mechanism in a reset condition.

Compactness of construction is achieved by positioning the core laminations of each output transformer at right angles to the core laminations of each input transformer. Tie bar means for clamping the laminations of the output transformer are provided with extensions that project througha wall of the trip unit housing and are staked for mechanical securement of the output transformer. The transformers are of compact construction in that they may operate at or near saturation since the control circuitry detects transformer output peaks rather than averages.

Accordingly, a primary object of the instant invention is to provide a novel construction for a removable and replaceable solid state tripping unit for a multi-pole circuit breaker.

Another object is to provide a tripping unit of this type in which there is a common housing for all of the circuit elements.

Still another object is to provide a tripping unit of this type in which a permanent magnet latch means is utilized for unlatching a mechanical latch which normallyholds a circuit breaker contact operating mechanism in reset position.

A further object is to provide a tripping unit of this type in which formations integral with transformer lamination tie bars are utilized for operatively securing the transformer.

A still further object is to provide a tripping unit of this type which utilizes control circuitry that detects current transformer output peaks and operates in conjunction with transformers operating at or near saturation.

These objects as well as other objects of this invention shall become readily apparent after reading the following description of the accompanying drawings in which.

Figure 1:
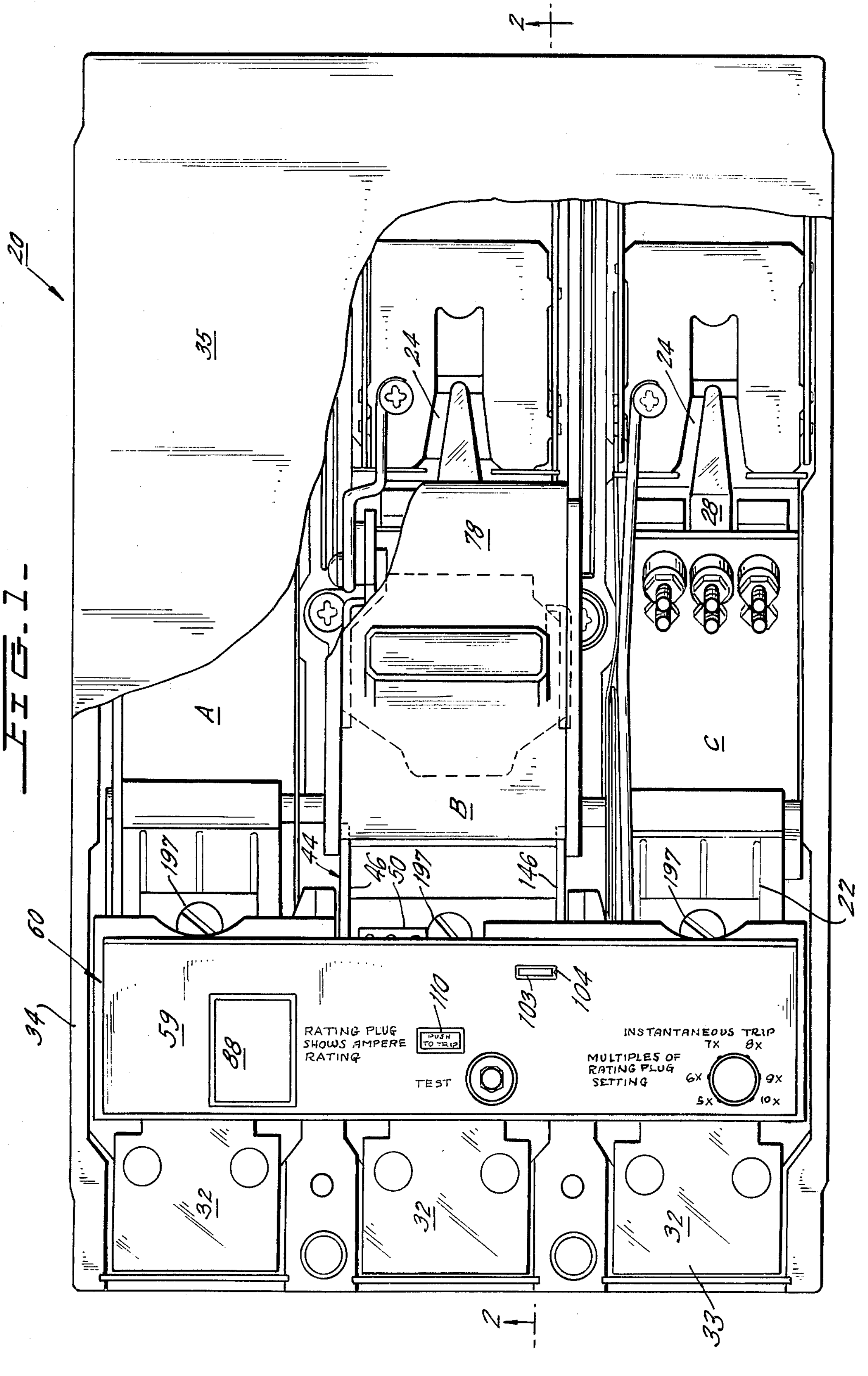
FIG. 1 is a plan view of a multi-pole circuit breaker incorporating a solid state trip unit constructed in accordance with the teachings of the instant invention, with most of the molded cover of the circuit breaker being broken away to reveal internal details.
Figure 2:
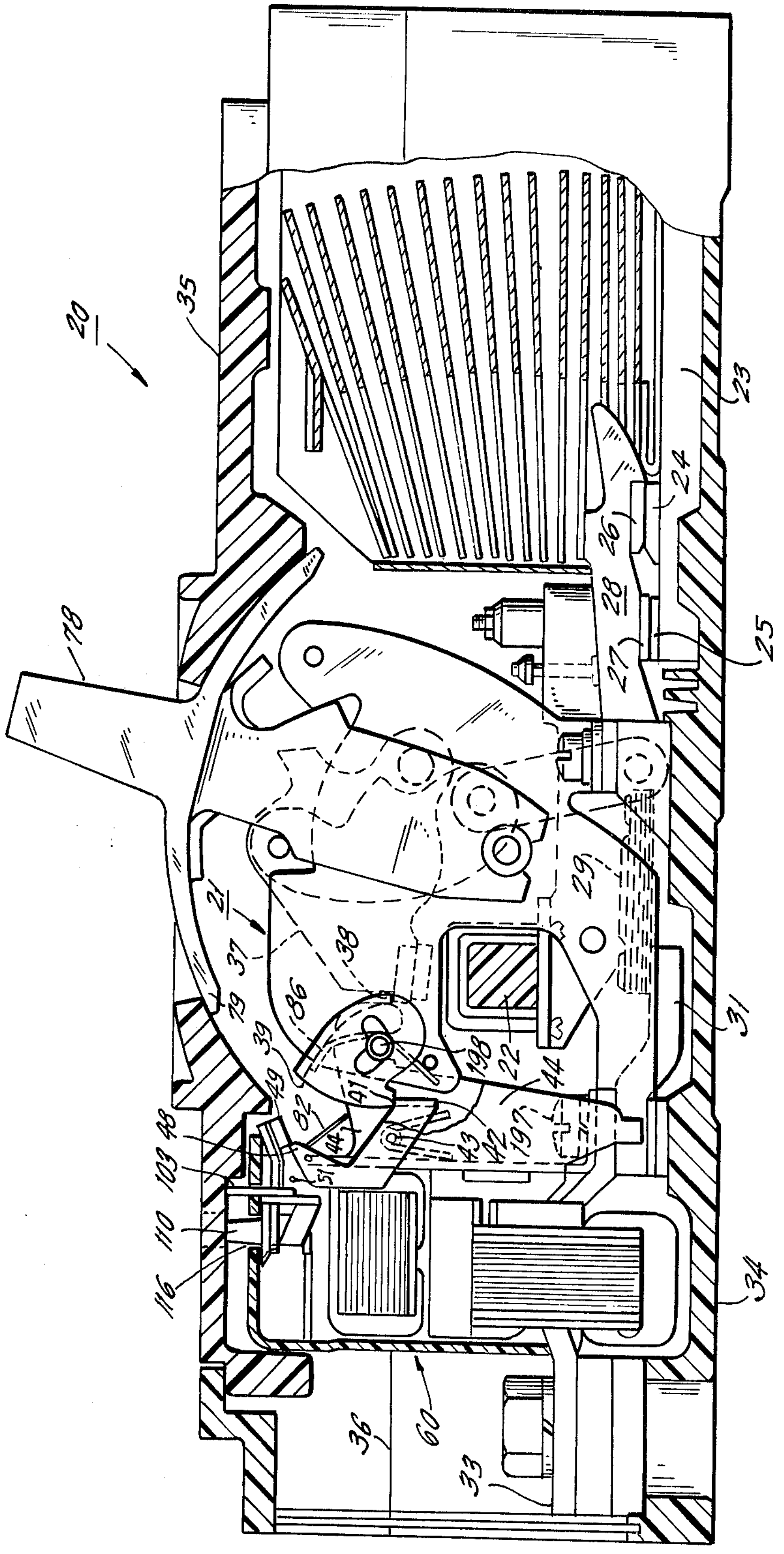
FIG. 2 is a longitudinal cross section taken through line 2—2 of FIG. 1 looking at the direction of arrows 2—2.

Now referring to the Figures. Molded case circuit breaker 20 of FIGS. 1 and 2 is provided with three poles A, B, C and a common spring powered contact operating mechanism 21 all disposed within a molded insulating housing consisting of base 34 and cover 35 which is separable from base 34 at line 36. Transverse insulating bar 22 provides a mechanical tie between poles A, B, C for simultaneous operation thereof in a manner well known to the art. As best seen in FIG. 2 the current carrying path through the center pole B consists of line terminal member 23, stationary arcing and main contacts 24, 25, movable arcing and main contacts 26, 27, movable contact arm means 28, flexible conductor 29, strap 31, and main bus section 32 which terminates in load terminal 33. The other two poles A and C have essentially the same current carrying elements as does center pole B.

Contact operating mechanism 21 is a conventional trip free sring powered over center toggle unit including releaseable cradle 37 which is normally held in the reset position shown in FIG. 2 by latching portion 38 of auxiliary latch 39. At point 41 auxiliary latch 39 is held by engagement with main latch 42 which is pivotally mounted on pin 43 that extends between spaced arms 45, 46 of latch support bracket 44. The end of main latch remote from point 41 is provided with nose 48 that is normally engaged by latching plate 49 on trip member 50. The latter is pivotally mounted on pin 51 which extends between arms 46, 52 of bracket 44. Operation of trip member 50 shall be hereinafter explained.

Figure 4:
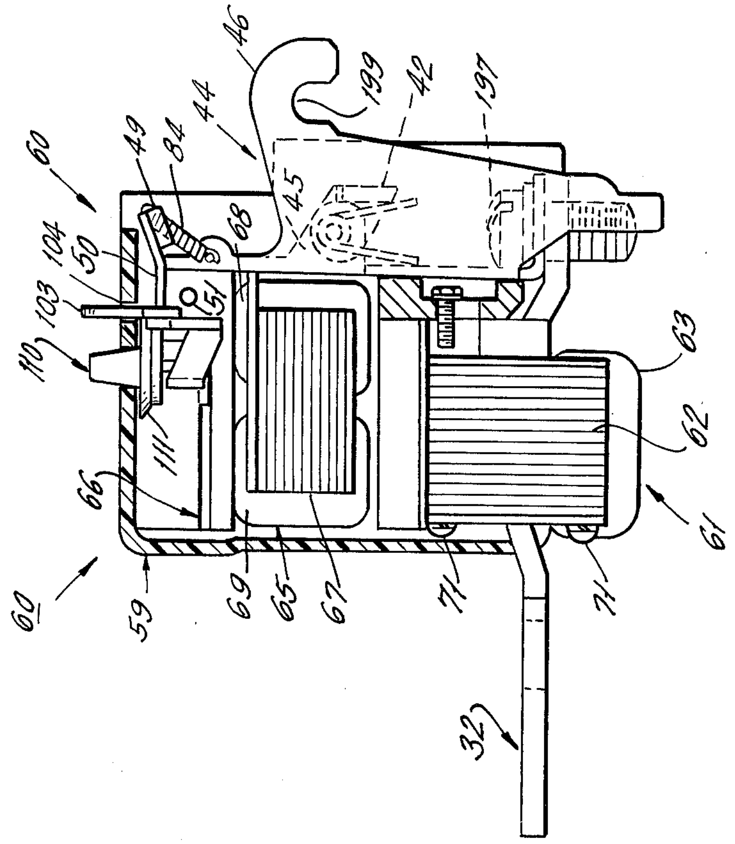
FIG. 4 is a cross section of trip unit taken through line 4—4 of FIG. 8 looking in the direction of arrows 4—4.
Figure 3:
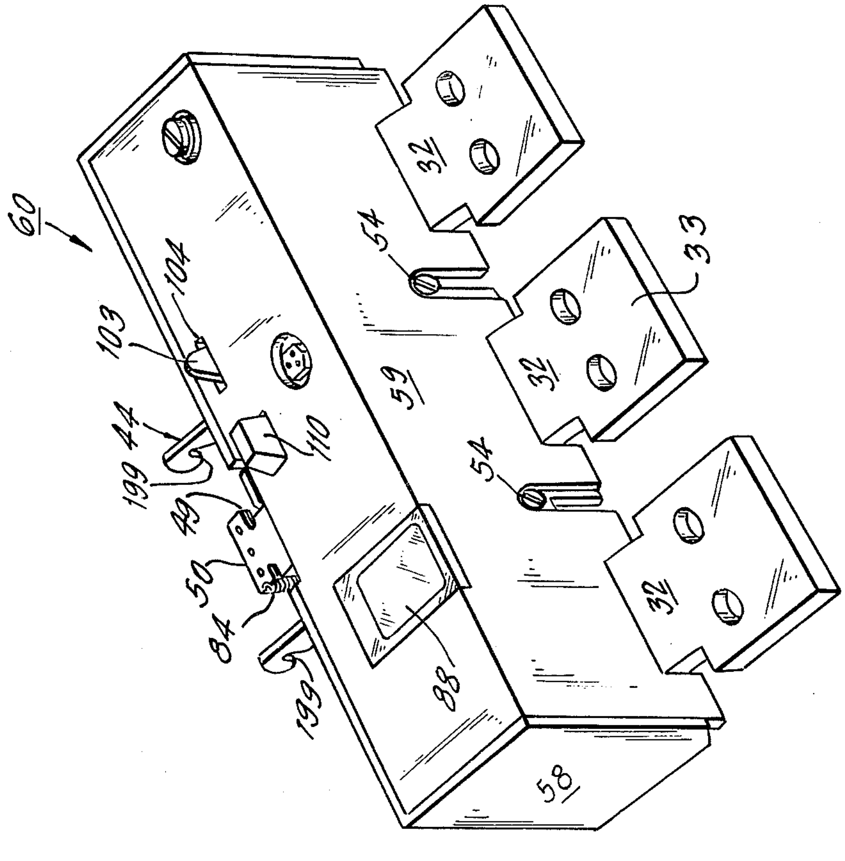
FIG. 3 is a perspective of the replaceable trip unit, looking toward the load end thereof.
Figure 5:
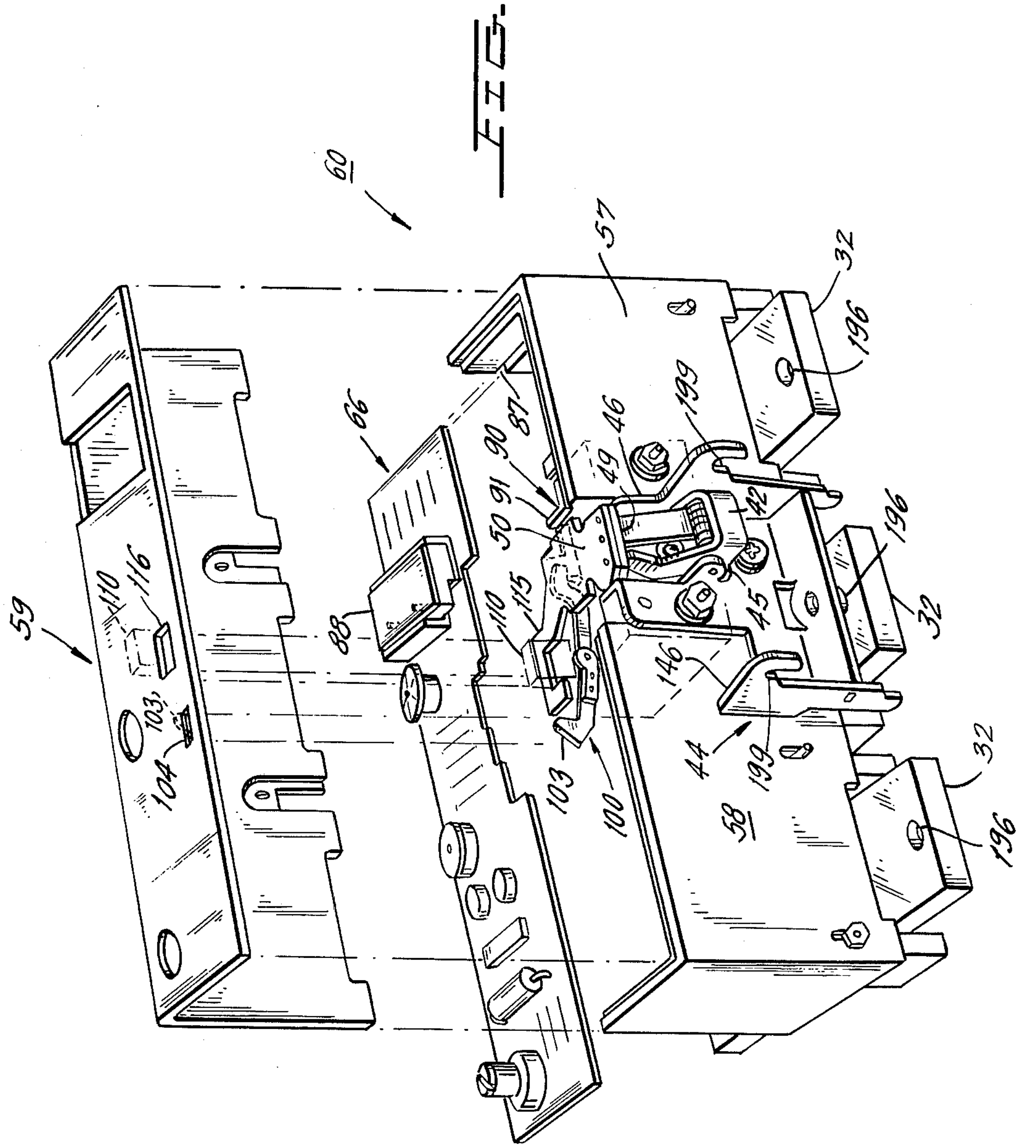
FIG. 5 is a partially exploded perspective of trip unit of FIG. 3, looking toward the line end thereof.

Bracket 44 and the elements mounted thereto constitute a sub-assembly which together with all three main buses 32 are elements of removable and replaceable solid state trip unit 60 disposed within circuit breaker housing 34, 35 at the load end thereof. The latter also includes a common insulating frame or housing consisting of member 58 having a U-shaped and cross-section member 59 having an L-shaped cross-section with the latter constituting a removable cover that is normally held in place by screws 54, 54. The web portion or wall 57 of member 58 extends in a plane generally perpendicular to main conductors 32. The latter are positioned at the bottom of housing 58, 59 when viewed with respect to FIGS. 3–5 and extend beyond both the line and load sides of housing 58, 59. Bracket 44 and the elements mounted thereon constitute a sub-assembly mounted to frame member 58 with the major portion of bracket 44 abutting the line side of wall 57 with pivot 51 for trip member 50 being positioned at the upper end of wall 57.

Each main bus 32 constitutes a single turn primary for an individual input transformer 61 provided for each of the circuit breaker poles A, B, C. Each input transformer 61 also includes square laminated magnetic frame or core 62 through which primary 32 extends. The multi-turn secondary of transformer 61 consists of multi-turn coils 63, 64 wound around opposite legs of core 62 and being connected in series aiding relationship. The output of secondary 63, 64 is fed through the multi-turn primary of output transformer 65 whose secondary feeds the solid state control circuitry on circuit board 66. Output transformer 65 is provided with a square laminated magnetic frame or core 67 having coil means 68, 69 mounted on opposite legs thereof. Each of the coil means 68, 69 consists of a portion of the primary and a portion of the secondary for output transformer 65. These primary portions are connected in series aiding relationship as are these secondary portions. In total, the secondary has many more turns than the primary.

Each of the input transformers 61 is mounted to walls 57 on the load side thereof by means of two of the four screws 71 which, in conjunction with tie bars 72, clamp the laminations of core 62. The laminations of core 67 are in planes at right angles to the planes in which the laminations of core 62 are disposed. The former are clamped together by four tie bars 73 held by rivets 74. Two of the tie bars 73 are provided with projections 75 that extend through wall 57. On the line side of wall 57 the free ends of projections 75 are staked to mechanically secure output transformer 65 in operative position on the load side of wall 57.

Figure 8:
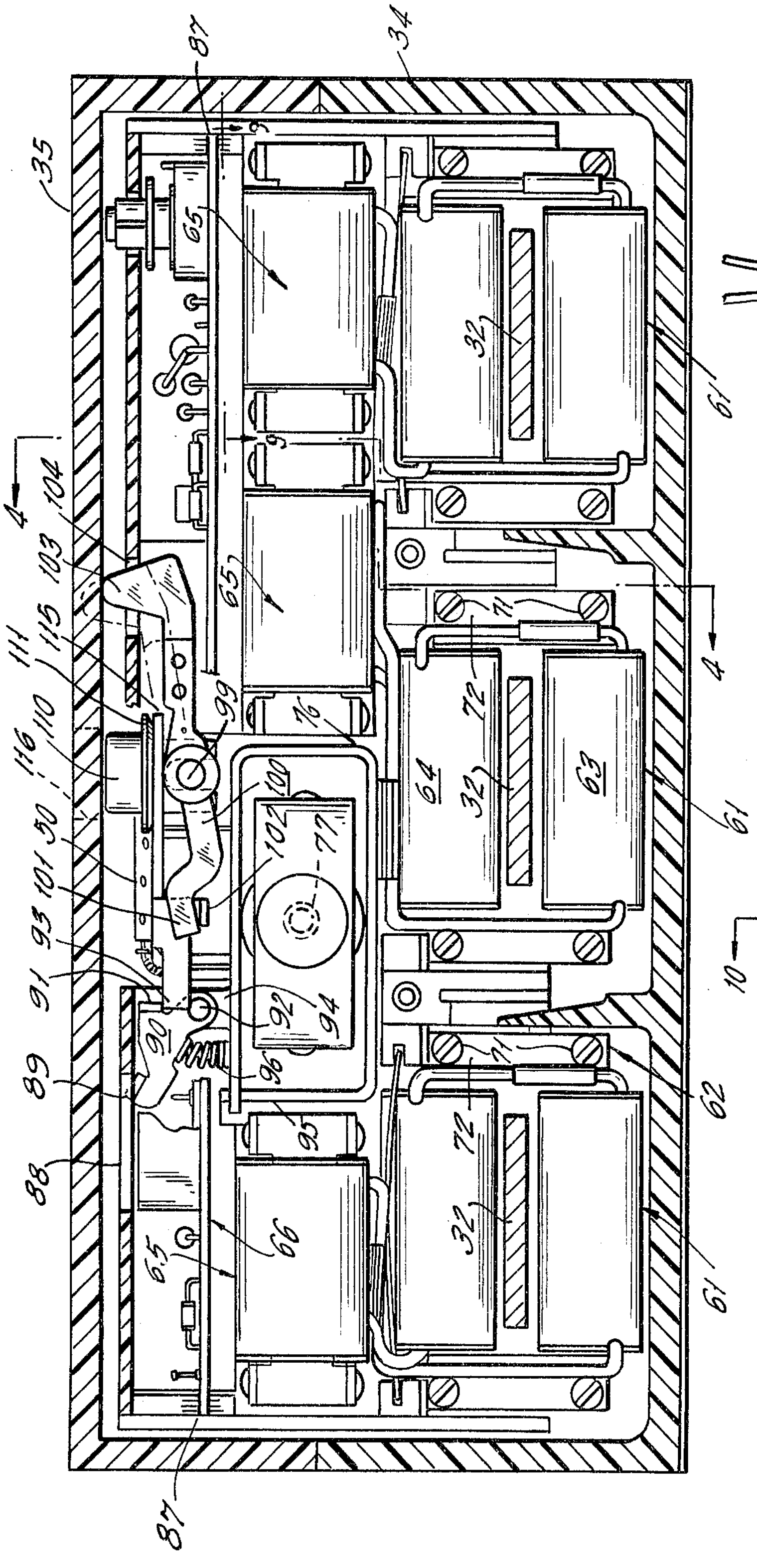
FIG. 8 is a cross section of trip unit, taken through line 8—8 of FIG. 6 looking in the direction of arrows 8—8.
Figure 10:
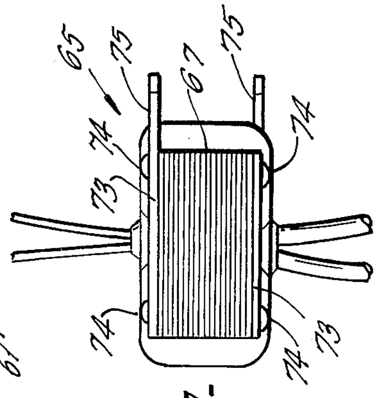
FIG. 10 is a side elevation of the output transformer of FIG. 9, looking in the direction of arrows 10—10 of FIG.9.
Figure 9:
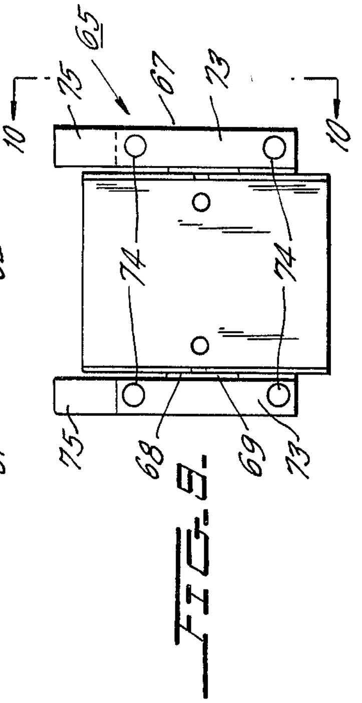
FIG. 9 is a plan view of one of the output transformers, looking in the direction of arrows 9—9 of FIG. 8.

Circuit board 66 is mounted by sliding the edges thereof in interior grooves 87 of frame member 58. As best seen in FIG. 8, all three input transformers 61 are arranged in a horizontal row below circuit board 66. Interposed between circuit board 66 and the row of transformers 61 is another horizontal row containing all three output transformers 65 together with permanent magnet latch 76. The latter is described in detail in my copending application Ser. No. 656,108, filed Feb. 9, 1976 now Pat. No. 3,984,795 for an Improved Magnetic Latch Construction, and assigned to the assignee of the instant invention. Latch 76 includes actuator 77 biased to the right with respect to FIG. 4 and normally held in a retracted position against its biasing force by a permanent magnet (not shown). In a manner well known to the art, plunger 77 is released by the permanent magnet when flux generated by the latter is bucked by a flux field resulting from an output signal generated by the control circuitry of board 66 when predetermined fault current conditions exist at one or more of the main buses 32. The construction and operation of the control circuit is illustrated and described in the L. Davis and P. Pang copending application Ser. No. 658,354 filed Feb. 17, 1976 for a Solid State Tripping Circuit and assigned to the assignee of the instant invention. It is noted that this circuit detects output peaks of output transformers 65 thereby permitting transformers 61, 65 to operate near saturation so that these transformers may be relatively compact.

Figure 12:
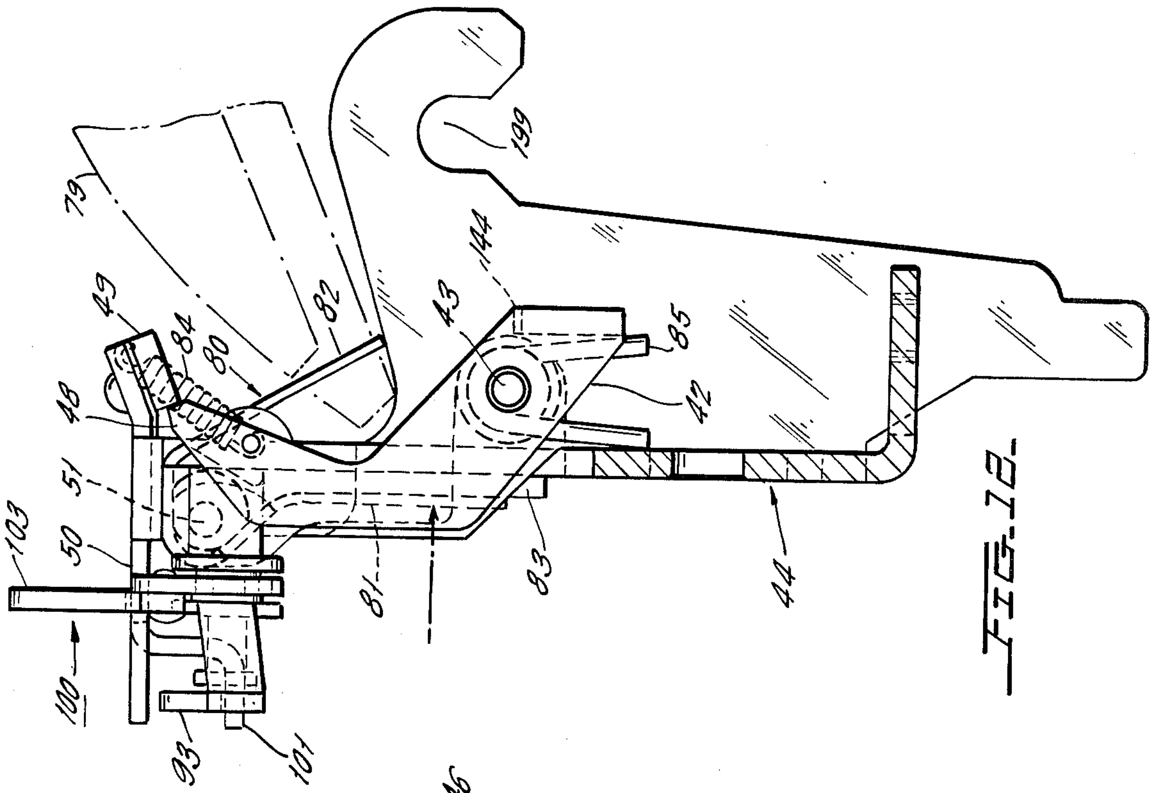
FIG. 12 is a side elevation of the mechanical latch sub-assembly, looking in the direction of arrows 12—12 of FIG. 11.
Figure 11:
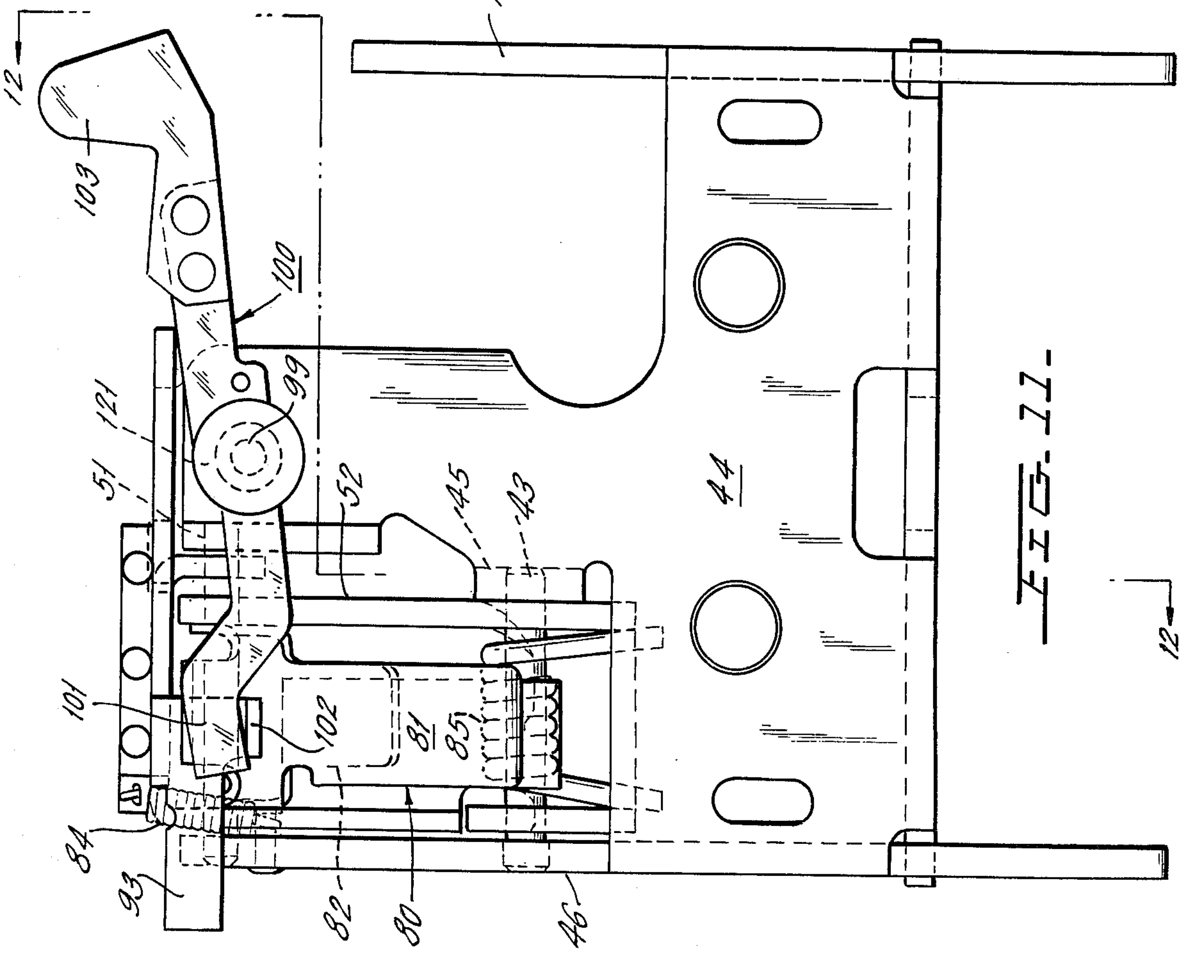
FIG. 11 is an enlarged elevation looking at the load side of the mechanical latch sub-assembly.

When actuator 77 is released and moves to the right with respect to FIG. 12 it engages arm 81 of reset member 80. The latter is constructed of relatively stiff springmetal sheel material and is pivoted on pin 51 together with trip member 50. Arm 81 is adjacent to arm 83 of trip member 50 so that the releasing or tripping motion of actuator 77 is transmitted by arm 81 to arm 83 thereby pivoting tripping member 50 in a counterclockwise direction. This releases nose 48 of main latch 42 from latch plate 49 permitting main latch 42 to pivot clockwise about pin 43 thereby releasing auxiliary latch 39 so that cradle 37 is free to move to its trip position under the influence of the main operating springs of contact operating mechanism 21.

In order to reset actuator 77 of permanent magnet latch 76, circuit breaker handle 78 is manually moved to the left with respect to FIG. 2 with handle guide extension 79 engaging arm 82 of reset member 80 causing member 80 to pivot clockwise with respect to FIG. 12 so that arm 81 engages the nose of actuator 77 moving the latter to the left with respect to FIG. 12 to its retracted or reset position where actuator 77 is held by the permanent magnet of latch 76. Tension spring 84 is then free to pivot trip member 50 clockwise to latch nose 48 behind bar 49. Torsion spring 85 biases main latch member 42 counterclokwise toward its reset position and another torsion spring 86 biases auxiliary latch 39 toward its reset position.

The relative positioning of main latch 42 with respect to auxiliary latch 39 is achieved by having hook formations 199 at the line ends of arms 46, 146 of bracket 44 receive pin 198. The latter is supported by the frame of contact operating mechanism 21 and provides a pivot for auxiliary latch member 39. Removable screws 197, extending through clearance apertures 196 in the line ends of buses 32, provides contact pressure between buses 32 and straps 31.

Figure 6:
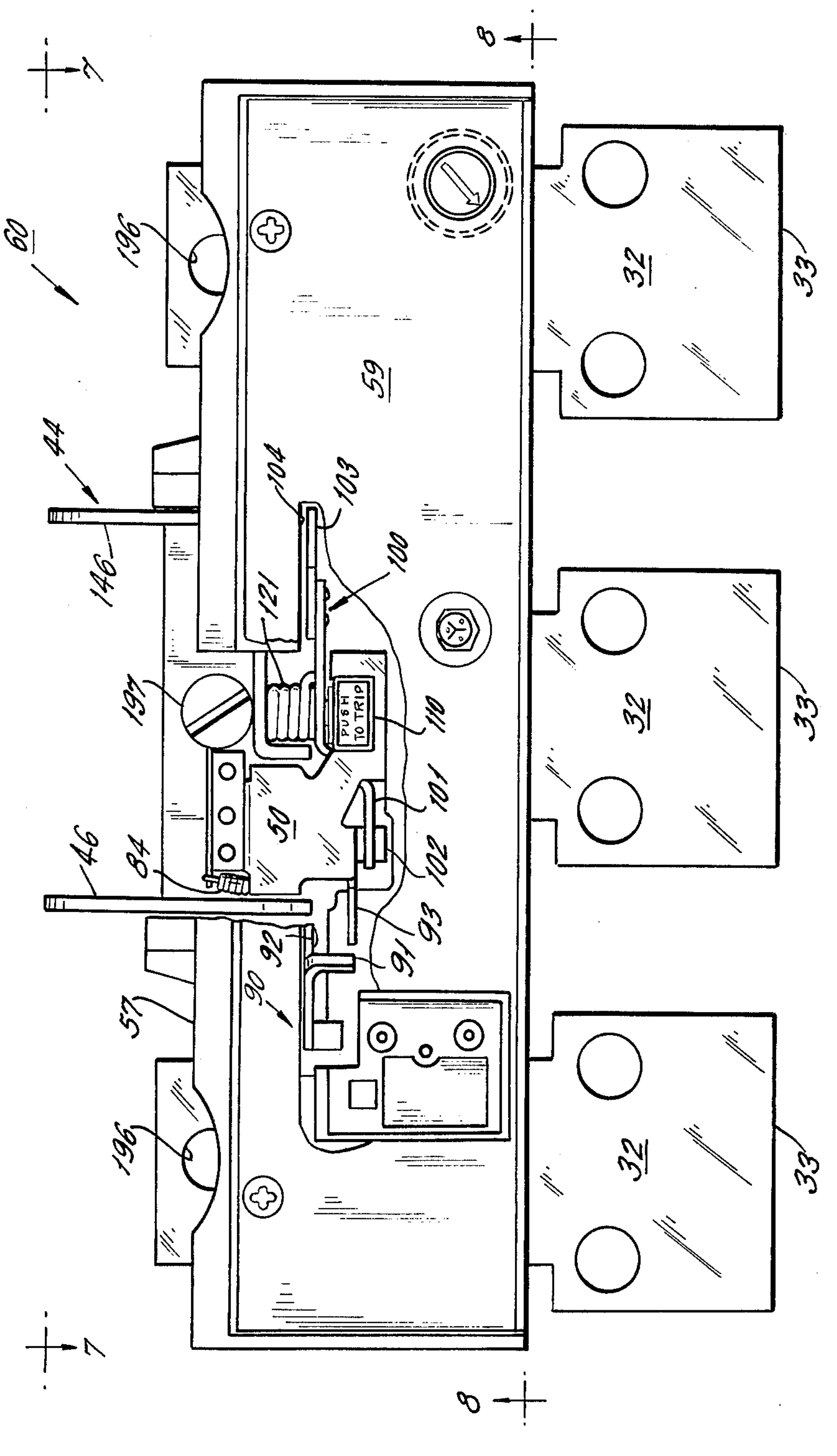
FIG. 6 is a plan view of the trip unit of FIG. 3 with a portion of the cover broken away.
Figure 7:
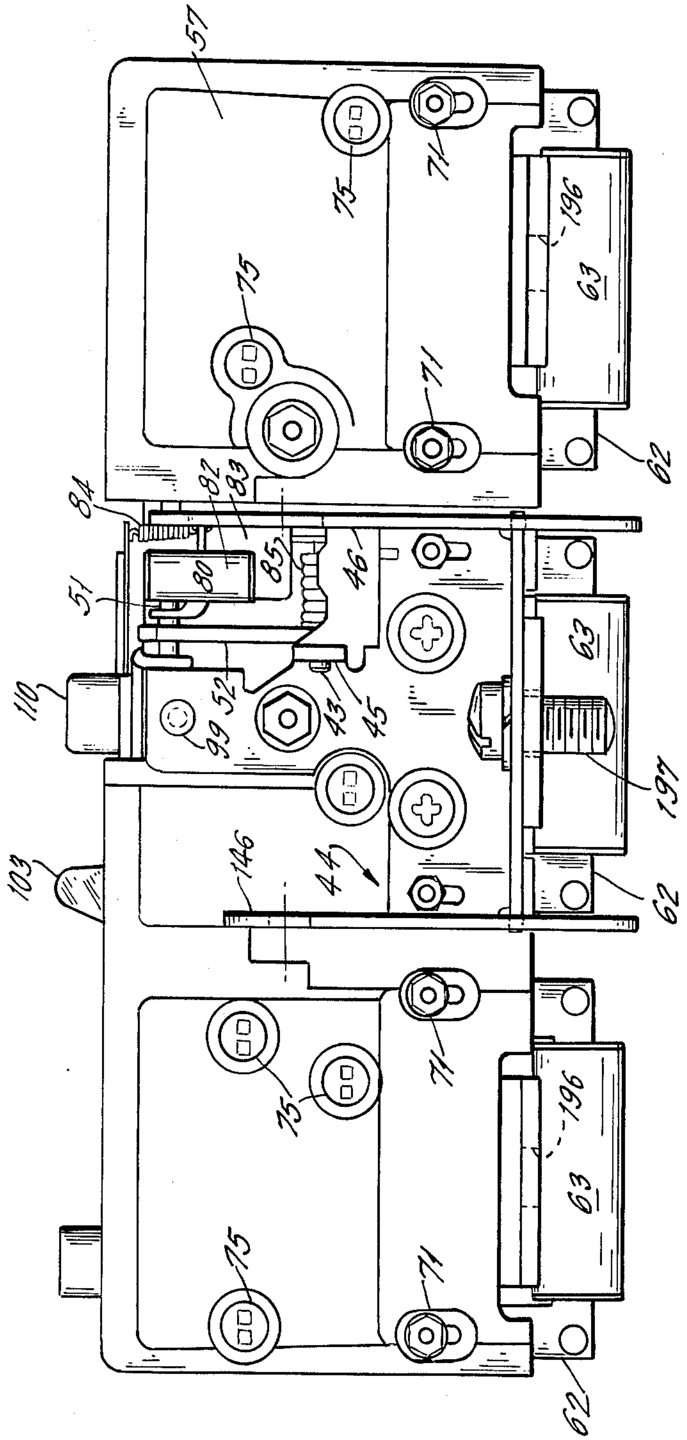
FIG. 7 is a line side elevation of the trip unit looking in the direction of arrows 7—7 of FIG. 6.

Cover interlock unit 100 is mounted near its center on pivot 99 and is biased counterclockwise with respect to FIG. 8 by torsion spring 121 (FIG. 6) so that end 101 engages projection 102 of trip member 50 to move member 50 counterclockwise with respect to FIG. 12 to its tripping position. The end of member 100 remote from end 101 is provided with upwardly extending nose 103 that projects through clearance slot 104 in cover 59 of trip unit housing 58, 59. As the circuit breaker housing cover 35 is mounted to base 34, the inside surface of cover 35 engages nose 103 to move the latter from the phantom position thereof. This pivotscover linterlock 100 clockwise with respect to FIG. 8 so that end 101 is raised to a position such that trip member 50 may move clockwise with respect to FIG. 12 to a position wherein latch plate 49 holds latch 42 in latching position. When cover 35, or a removable portion thereof (not shown) aligned with nose 103, is opened, torsion spring 121 pivots unit 100 clockwise thereby operating trip member 50 counterclockwise with respect to FIG. 12 to release latch 42.

Circuit board 66 includes frictionally held rating plug 88 which includes one or more of the elements, such as a resistor or capacitor, which determines operation of the electronic processing circuitry of board 66. When operatively positioned as shown in FIG. 8, plug 88 engages ear 89 of plug interlock member 90 to pivot same counterclockwise about rivet 92 as a center so that latching ear 91 of member 90 moves clear of extension 93 on trip member 50. Rivet 92 extends through ear 94 which projects upward from shield housing 95 of permanent magnet latch 76. Coiled compression spring 96 is interposed between shield 95 and member 90 so that when rating plug 88 is removed member 90 pivots clockwise with ear 91 thereof engaging extension 93 causing trip member 50 to remain in the tripped position to which it had previously been moved by cover interlock unit 100.

It is noted that while spring 121 for cover interlock 100 is strong enough to trip breaker 20, rating plug interlock spring 96 is not strong enough to trip breaker 20. However, spring 96 is strong enough to hold trip member 50 in tripped position once it has been operated thereto of cover interlock unit 100. Thus, cover interlock 100 is a tripping device while rating plug interlock 90 is a latching device.

Manually operable trip member 110 projects upward through aperture 116 in trip unit housing cover 59. The lower end of member 110 is bifurcated and straddles pin 99 which acts to guide member 110 as it is being depressed. Flange 111 of member 110 is disposed inside of trip unit housing 58, 59 and is supported on trip member extension 115 so that when member 110 is depressed trip member 50 is pivoted counterclockwise about pin 51 with respect to FIG. 12 to release nose 48 of main latch 42 from latch plate 49 thereby tripping operating mechanism 21.

In a practical construction for a breaker having a continuous current rating of 800 amperes at 600 volts, the turns ratio of each input transformer 61 is 300:1 and the turns ratio of each output transformer 65 is 50:1.

Thus, it is seen that the instant invention provides a compact construction for a solid state automatic tripping unit for molded case circuit breakers for relatively high current ratings. The construction is such that the solid state trip unit used in a circuit breaker having the same rating. Further, the solid state trip unit is so constructed that all of the sensing elements and solid state control elements are disposed on the load side of an insulating wall which provides a barrier between these elements and the contact mechanism of the circuit breaker. In particular all of these elements are disposed within a common insulating housing.

Although there has been described a preferred embodiment of this invention, many variations and modifications will now be apparent to those skilled in the art. Therefore, this invention is to be limited, not by the specific disclosure herein, but only by the appended claims.

What is claimed is:

1. A removable and replaceable automatic multipole trip unit assembly for a multipole circuit breaker, said assembly including an insulating base comprising a front wall; for each pole of said trip unit a main conductor extending through said wall at the bottom thereof and projecting forward and rearward thereof; an input transformer comprising a first multi-turn secondary and a single turn primary provided by said conductor, an output transformer comprising a multi-turn primary fed by said secondary and a second multi-turn secondary having more turns than said multi-turn primary; mechanical latch means secured to said base in position for cooperation with a trip free circuit breaker contact operating mechanism disposed forward of said wall; controllable means for releasing said latch; solid-state control means having an input fed by all of said second secondaries and an output operatively connected to said controllable means for activation thereof to release said latch when predetermined current conditions are present in any of said main conductors; all of said input transformers positioned in a first row disposed behind said wall; all of said controllable means positioned in a second row disposed behind said wall row above said first row; said control means positioned behind said wall; said second row being between said control means and said first row.

2. A trip unit assembly as set forth in claim 1 wherein each of said input and output transformers includes a core magnetically coupling the primary and secondary; said base defining a common enclosure whrein said control means, said controllable means and all of said cores are disposed.

3. A trip unit assembly as set forth in claim 1 in which said control means includes a circuit board positioned generally perpendicular to said wall.

4. A trip unit assembly as set forth in claim 2 in which the base includes channel means wherein edge portions of said circuit board are held.

5. A trip unit assembly as set forth in claim 1 in which the controllable means includes a permanent magnet latch including actuating means, spring means biasing said actuating means to a trip position for releasing said latch means, a permanent magnet for holding said actuating means in a normal position remote from said trip position against force exerted by said spring means, and coil means to generate flux bucking flux generated by said permanent magnet when said controlled means is activated by said control means thereby permitting said spring means to operate said actuating means to said trip position.

6. A trip unit assembly as set forth in claim 5 also including a resilient reset means through which said actuating means acts to release said latch means; said reset means being operatively positioned for operation by a circuit breaker handle to move said actuating means from said trip position to said normal position.

7. A trip unit assembly as set forth in claim 1 wherein each of said input and output transformers includes a core magnetically coupling the primary and secondary; each of said cores of said output transformers constructed of a plurality of laminations in planes perpendicular to said wall, and means including tie bars for securing together the laminations of said output transformer, a plurality of said tie bars having extensions formed integrally therewith through said wall for mechanically securing said output transformer to said base.

8. A trip unit assembly as set forth in claim 7 in which each of the extensions has a free end that is positioned forward of said wall and is staked for mechanically securing said output transformer to said base.

9. A trip unit assembly as set forth in claim 1 in which each of the first secondaries includes first and second multi-turn sections that are serially connected.

10. A trip unit assembly as set forth in claim 1 in which the solid-state control means includes circuitry that functions responsive to output peaks of signals appearing at said input.

* * * * *